United States Patent
Hein et al.

(10) Patent No.: US 6,580,903 B2
(45) Date of Patent: Jun. 17, 2003

(54) CIRCUIT AND METHOD FOR RECORDING AND PLAYING BACK VOICE AND OTHER SOUNDS IN DIGITAL MOBILE RADIO DEVICES

(75) Inventors: Werner Hein, München (DE); Johann Steger, München (DE); Jürgen Paulus, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/789,783

(22) Filed: Feb. 20, 2001

(65) Prior Publication Data

US 2001/0018352 A1 Aug. 30, 2001

Related U.S. Application Data

(63) Continuation of application No. PCT/DE99/02606, filed on Aug. 19, 1999.

(30) Foreign Application Priority Data

Aug. 19, 1998 (DE) .......................... 198 37 652

(51) Int. Cl.⁷ .............................................. H04M 11/10
(52) U.S. Cl. ........................................ 455/412; 455/563
(58) Field of Search ................................ 455/556, 563, 455/412, 567, 569; 379/88.26, 88.27, 88.28

(56) References Cited

U.S. PATENT DOCUMENTS

| 5,425,031 A | 6/1995 | Otsuka |
| 5,583,915 A | 12/1996 | Ishida |
| 6,212,550 B1 * | 4/2001 | Segur ...................... 379/88.14 |
| 6,233,320 B1 * | 5/2001 | Haimi-Cohen ........... 379/88.16 |
| 6,256,354 B1 * | 7/2001 | Yoshida et al. ............. 375/219 |

FOREIGN PATENT DOCUMENTS

| EP | 0 534 478 B1 | 3/1993 |
| EP | 0 642 286 A2 | 3/1995 |
| EP | 0 725 499 A1 | 8/1996 |
| EP | 0 762 711 A2 | 3/1997 |
| EP | 0 798 908 A1 | 10/1997 |
| EP | 0 942 571 A1 | 9/1999 |
| GB | 2 332 130 A | 6/1999 |
| JP | 05 007 181 | 1/1993 |

OTHER PUBLICATIONS

Siemens Firmware Documentation PMB 2800/2707, pp. 121–125, as cited on page 2 of the specification.

* cited by examiner

Primary Examiner—Daniel Hunter
Assistant Examiner—Nick Corsaro
(74) Attorney, Agent, or Firm—Laurence A. Greenberg; Werner H. Stemer; Ralph E. Locher

(57) ABSTRACT

A circuit for recording and playing back voice in digital mobile radio devices and a method for appropriately recording and playing back the voice. The circuit includes a transmit-end voice encoder, a receive-end voice decoder, a memory for the recorded signals, a further voice encoder whose output is connected to the memory, and a further voice decoder whose input is connected to the memory.

10 Claims, 3 Drawing Sheets

CIRCUIT AND METHOD FOR RECORDING AND PLAYING BACK VOICE AND OTHER SOUNDS IN DIGITAL MOBILE RADIO DEVICES

CROSS-REFERENCE TO RELATED APPLICATION

This application is a continuation of copending International Application No. PCT/DE99/02606, filed Aug. 19, 1999, which designated the United States.

Background of the Invention

Field of the Invention

The present invention relates to a circuit and a method for recording and playing back voice and other sounds in digital mobile radio devices.

In the prior art, in order to store voice in mobile radio devices, the received voice data has hitherto been stored in digital form in a memory. The corresponding voice data has later been called from the memory and played back via the normal receive-end voice decoder of the mobile radio device and its loudspeaker. Voice recorded by the mobile radio device using the built-in microphone has been stored in digital form in the memory by the normal voice encoder after customary digitization, and transmitted from the memory at a later time.

The European patent application EP 0 762 711 A2 describes a dual-band mobile telephone which can be operated in an analog mode and a digital mode. The device also has a memory in which both received voice information and voice information which is to be transmitted can be stored. In this context a suitable circuit ensures that the data stored in the memory are always present in a compressed form. If received voice signals are to be stored in the memory, the demodulated voice signal is fed to the memory either directly (digital mode) or compressed (in analog mode) with a reduced signal rate and then supplied to the memory. The compressed voice data is output to the loudspeaker of the mobile radio device by a voice decoder, and accordingly there is no need for a further voice decoder to transmit the stored voice data via the radio link.

A further prior art is scheme is disclosed in Siemens Firmware Dokumentation [Siemens Firmware Documentation] PMB 2800/2707, pages 121 to 125. This prior art has the following disadvantages:

The data format is dependent on the voice code used and furthermore the data can be stored only in the form in which they were transmitted by radio. Because of the relatively high susceptibility of the radio path to interference, it is usually necessary additionally to provide error correction data which unnecessarily increase the storage capacity required. In addition, it is subsequently impossible to perform further compression of the data record according to the prior art. Furthermore, the prior art does not permit correction of data which have been received with interference and which are to be transmitted after storage.

SUMMARY OF THE INVENTION

It is accordingly an object of the invention to provide a method for storing voice in mobile radio devices and a circuit for performing the method which overcomes the above-mentioned disadvantageous of the prior art methods and circuits of this general type, and in which the method is substantially more flexible than prior art methods.

With the foregoing and other objects in view there is provided, in accordance with the invention a circuit for recording and playing back voice and other sounds in digital mobile radio devices. The circuit includes a transmit signal path including a first voice encoder configured therein for encoding voice signals to be transmitted via a radio link; a receive signal path including a first voice decoder configured therein for decoding voice signals received via the radio link; a memory for storing voice signals and for outputting the voice signals; a second voice encoder having an output connected to the memory; and a second voice decoder having an input connected to the memory for receiving the voice signals output from the memory. The second voice decoder is configured for decoding the voice signals output from the memory and for sending the voice signals output from the memory to a loudspeaker. The first voice decoder is configured to always decode ones of the voice signals received via the radio link that are to be stored in the memory and to send the decoded ones of the voice signals to the second voice encoder for subsequent encoding.

This voice storage (frequently also referred to as "Voice Memo" will preferably also permit the following functions:
1. The mobile radio device will be used as a dictaphone in the so-called "stand-by" mode, i.e. if the device is switched on, without a call being made.
2. It will be possible to output previously recorded messages to the other party or to the original party itself or to both during the call.
3. In addition it should be possible to output different messages to the other party or to the original party itself.
4. Furthermore, it should be possible during the call to record only the other party, only the original party itself or both parties.

As a result, the voice data can be stored in a data format which is more efficient with respect to memory location.

In accordance with an added feature of the invention, the circuit is configured in such a way that the output of the second voice decoder is connected to the loudspeaker of the mobile radio device. In this way playback of the stored data to the user of the mobile radio device is improved.

In accordance with an additional feature of the invention, the circuit is provided with a further, third voice decoder whose input is connected to the memory. Preferably, the output of the third voice decoder is connected to the input of the first voice encoder. This permits very flexible calling of stored messages for transmission.

In accordance with an another feature of the invention, the second voice encoder is connected via a summing point both to the output of the receive-end, first voice decoder and to the microphone of the mobile radio device. In this way, both received messages and messages which are input by the user of the mobile radio device can be stored in a particularly advantageous way.

In accordance with a further feature of the invention, a controllable amplifier is connected between the output of the first voice decoder and the summing point and between the microphone and the summing point, respectively. In this way, both the signal from the original party itself and the signal received from the other party can be stored together during the call.

The controllability of the amplifier also permits very good adaptation of the drive level control.

In accordance with a further added feature of the invention, the connection between the second voice decoder and the loudspeaker is made via a further summing point whose other input is connected to the output of the first voice decoder. It is particularly preferred here to connect a controllable amplifier between the output of the second voice decoder and the further summing point and between the output of the first voice decoder and the further summing point, respectively. In this way, it is also possible to simultaneously play back from the memory and listen to the currently received signal.

In accordance with a further additional feature of the invention, the connection between the third voice decoder and the input of the transmit-end, first voice encoder is made via an additional summing point whose other input is connected to the microphone output. It is particularly preferred here to connect a controllable amplifier between the output of the third voice decoder and the additional summing point and between the microphone output and the additional summing point, respectively. In this way, it is also possible to transmit a previously stored message while simultaneously giving a commentary. The controllable amplifiers again permit suitable drive level control of the two signals.

With the foregoing and other objects in view there is also provided, in accordance with the invention a method for recording and playing back voice and other sounds in digital mobile radio devices in which the voice is transmitted in digitally encoded form and a possibility for storing voice signals is provided. The method includes: transmitting a voice signal in a digitally encoded form via a radio link; always using a method to encode a voice signal to be stored that is independent from a method used to encode the voice signal that is transmitted via the radio link; and always using a method to decode the stored voice signal that is independent from a method used to decode the voice signal that is transmitted via the radio link.

In accordance with a concomitant mode of the invention, the method uses different coding and decoding circuits for the stored voice signals than for the voice signals transmitted via the radio link.

Other features which are considered as characteristic for the invention are set forth in the appended claims.

Although the invention is illustrated and described herein as embodied in a circuit and method for recording and playing back voice and other sounds in digital mobile radio devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
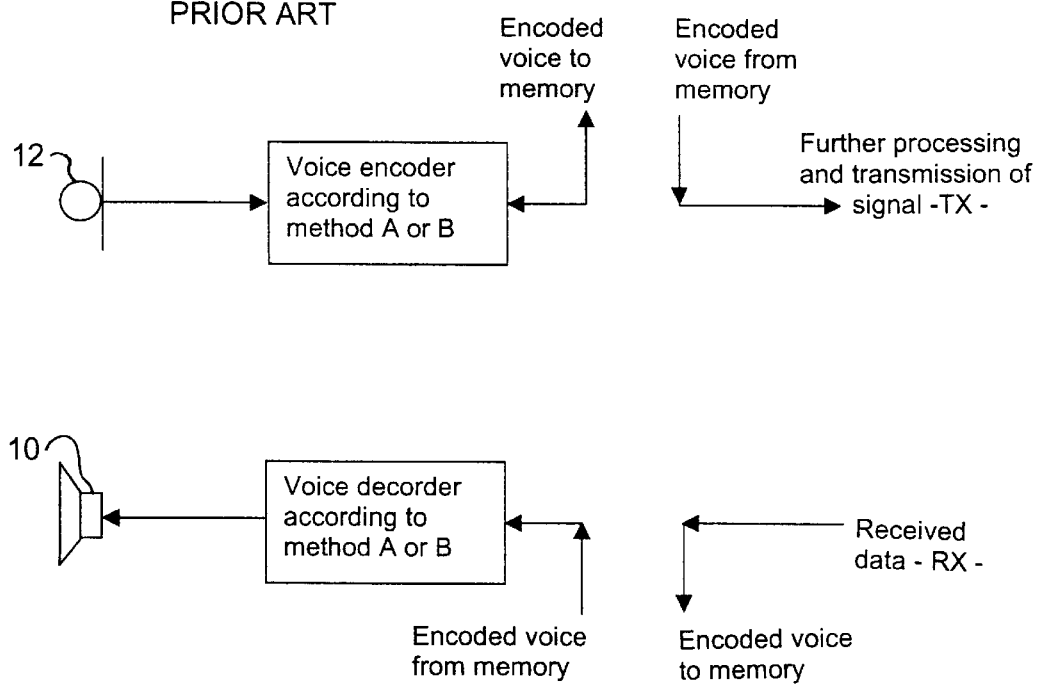
FIG. 1 shows a circuit for recording and playing back voice in digital mobile radio devices according to the prior art.

Referring now to the figures of the drawing in detail and first, particularly, to FIG. 1 thereof, there is shown a prior art circuit as an aid in understanding the present invention. Here, the received data are either output directly at the loudspeaker 10 of the mobile radio device or stored directly in digital form. The directly stored data can then be converted into sound signals from the memory from the normal receive-end voice decoder at a later time. Problems arise here in particular if the mobile radio device is to process voice encoded in different ways (method A or method B), and therefore a switchable decoder is provided. It is then always necessary to assign the corresponding, correct code to the voice signal stored in the memory. This requires relatively complex administration.

Figure 2:
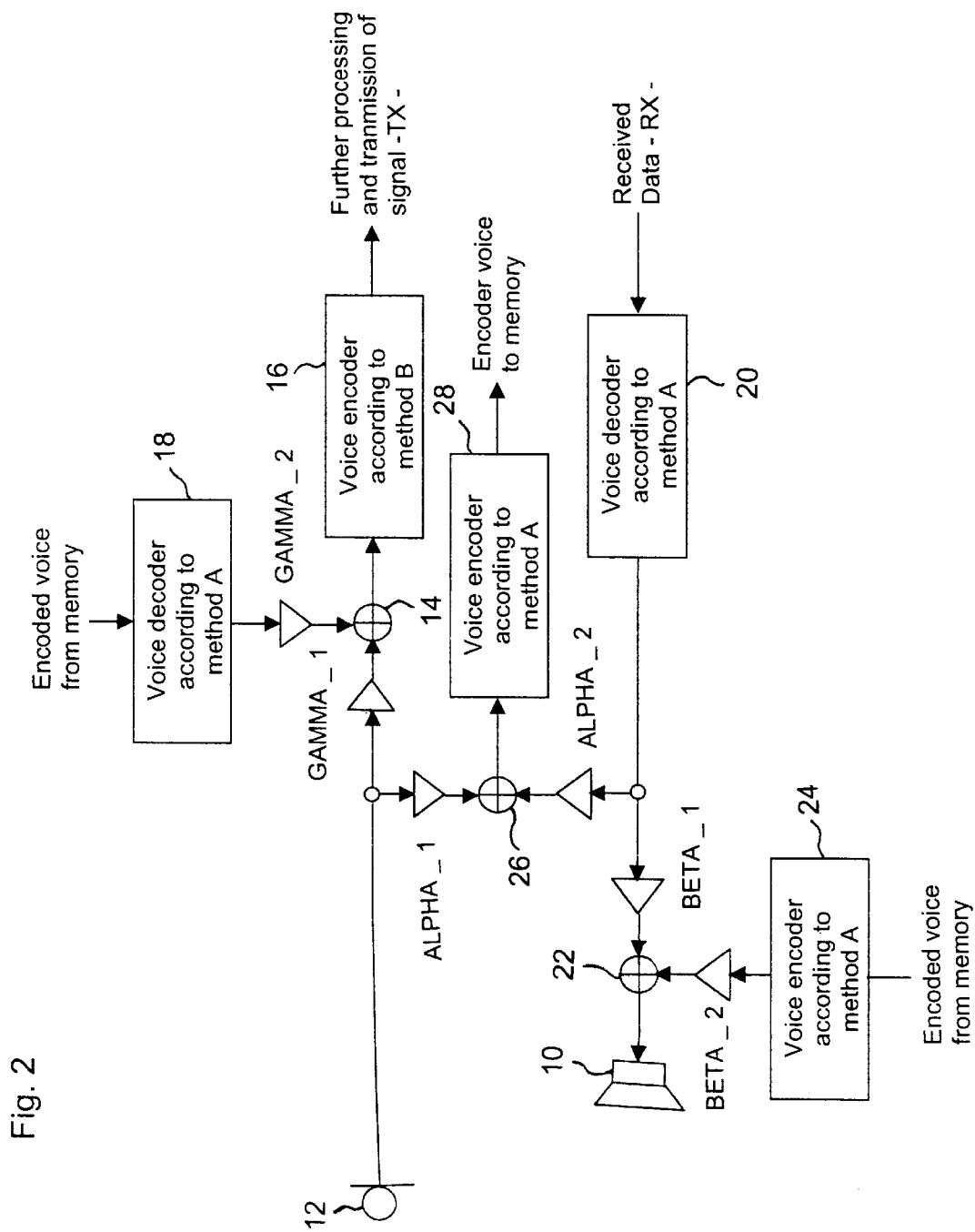
FIG. 2 shows a basic circuit diagram of the circuit according to the invention.

The transmit branch of a conventional mobile radio device according to the prior art has a design corresponding to the above. The microphone 12 is connected to the voice encoder. The corresponding digital signals are fed from the voice encoder either directly for transmission to the memory or are compressed first. Data for transmission can be removed from the memory. FIG. 2 accordingly shows a basic circuit diagram of the present invention. The analog voice signals from the microphone 12 of the mobile radio device are fed to two controllable amplifiers Alpha_1 and Gamma_1. The controllable amplifier Gamma_1 is connected to a summing node 14. From there, the analog signal is transmitted, as is customary, to the transmit-end voice encoder 16 and from there in digital form to means for further processing the signal and for transmitting it. In order to transmit a recorded message, an appropriate signal can be fed to the summing point 14. This signal is generated in that the voice encoded in digital form is extracted from the memory and input into the voice decoder 18 and converted there into analog voice signals. The signals are fed from the voice decoder 18 via a controllable amplifier Gamma_2 to the summing point 14 and from there also to the transmit-end voice encoder 16. Because a summing point 14 and two controllable amplifiers Gamma_1 and Gamma_2 are present there, voice from the microphone 12 can also be mixed with a stored message and transmitted in this form if the controllable amplifiers Gamma_1 and Gamma_2 are correspondingly set.

The digitally received data RX are fed, as is customary, to a receive-end voice decoder 20. They are converted there into analog voice signals and fed to a controllable amplifier Beta_1. From there they are fed to a further summing point 22 and from there to the loudspeaker 10 of the mobile radio device. At the summing point 22, voice signals called from the memory are supplied for playback to the user. For this purpose, the encoded voice data from the memory are fed to a voice decoder 24. From there the corresponding analog voice signals are fed to a further controllable amplifier Beta_2 and from there to the summing point 22 and the loudspeaker 10.

Voice is recorded when the user records messages using the microphone 12. The signals traverse the signal path branching to the microphone 12 to the controllable amplifier Alpha_1 and from there proceed to a further summing point 26. From there the signals are fed to a further voice encoder 28 which converts the voice signals into corresponding digital data. This digital data is then stored in the memory. A further signal path is available for recording received messages, specifically, the signal path branching from the receive-end voice decoder 20. The signal path leads to a further controllable amplifier Alpha_2 whose output is also connected to the summing point 26. From there the analog signals are also fed to the voice encoder 28 and from there as digital data into the memory.

By appropriately controlling the controllable amplifiers Alpha_1 and Alpha_2 it is possible to set whether only voice input via the microphone 12 or only received voice from the receive-end voice decoder 20 is to be stored, or whether both the local and the remote voice signal are to be recorded together. By appropriately controlling the amplifiers Alpha_1 and Alpha_2 it is also possible here to perform appropriate adjustment of the volume of the local voice signal and of the received voice signal.

With the circuit described here it is possible to use completely different encoding methods for the digital voice data to be stored and for the voice data transmitted via a radio link. The encoding and decoding of the signals transmitted on the radio path is carried out by the voice encoder 16 and voice decoder 20, respectively. The voice signals fed into the memory are accordingly encrypted by means of the voice encoder 28 and decrypted by means of the two voice decoders 18 and 24.

It is possible, if appropriate, to dispense with the voice decoder 18 and the associated amplifiers Gamma_1 and Gamma_2 and with the summing point 14 if it is not necessary also to transmit stored messages.

The different encoding methods are referred to in the drawing by "method A" (the internal encoding method of the mobile radio device) and "method B" (the encoding method for the radio path).

Figure 3:
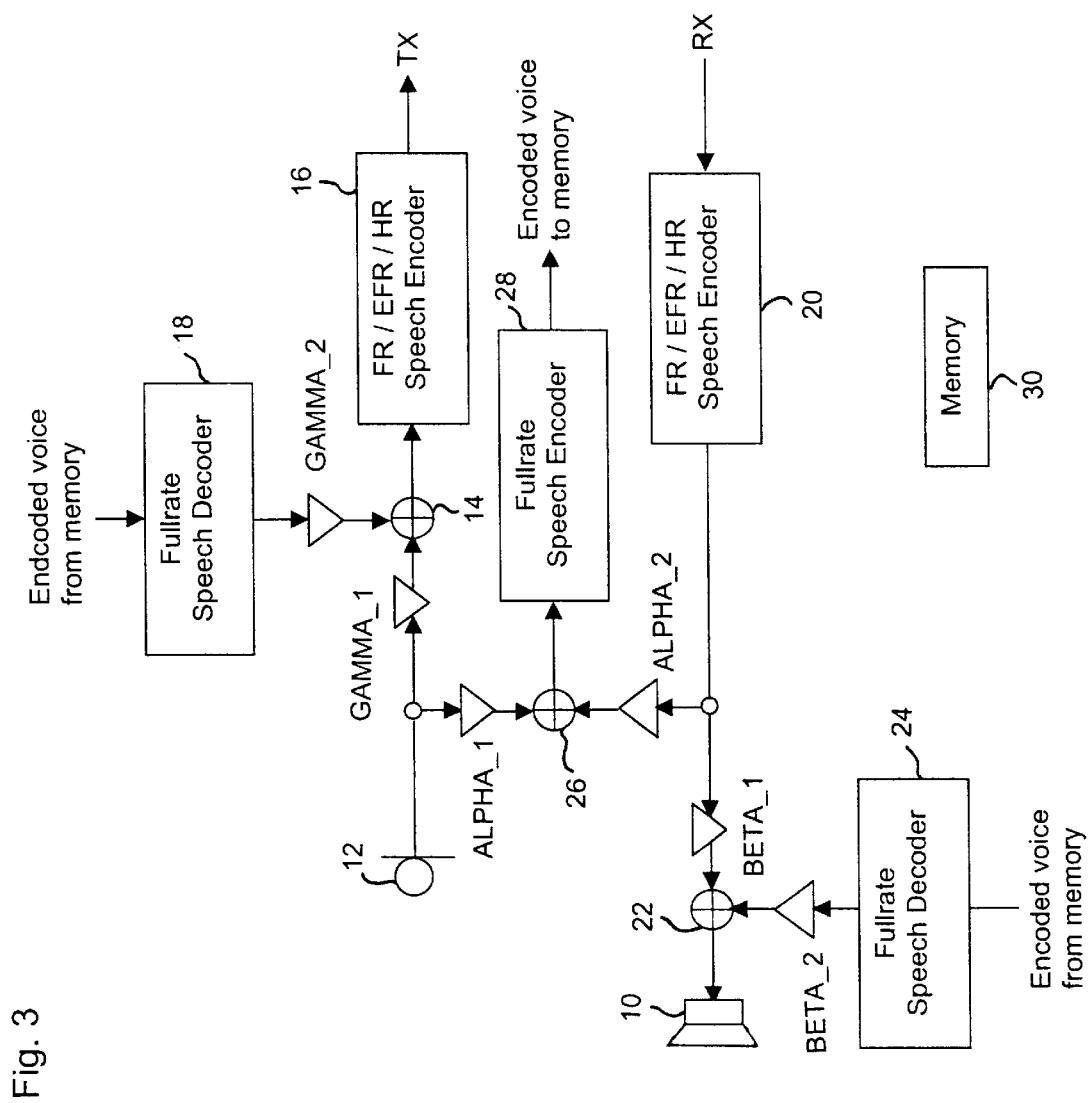
FIG. 3 shows a basic circuit diagram of the present invention with detailed explanations.

FIG. 3 shows a circuit diagram of the actual embodiment of the invention. The voice is always stored in the full rate code in the memory 30. For this reason, the encoder 28 is a full rate speech encoder while the decoders 18 and 24 are embodied as full rate speech decoders. The transmit-end voice encoder 16 can be switched over, for example, between various operating modes (full rate=FR, enhanced full rate=EFR and half rate=HR). The receive-end voice decoder 20 can also be switched over between these three operating modes. Nevertheless, the data are always present in the same form in the memory 30.

The present invention is therefore capable of implementing the following operating modes:

1. Recording in Stand-By Mode:

A message is input by the user by means of the microphone 12. For this purpose the controllable amplifier Alpha_1 is set to 1 and the controllable amplifier Alpha_2 is set to 0. The two signal paths TX and RX are not operational.

2. Recording During a Telephone Call:

The two controllable amplifiers Gamma_1 and Beta_1 are set to 1. The two controllable amplifiers Gamma_2 and Beta_2 are set to 0. Selective recording is possible by setting the two controllable amplifiers Alpha_1 and Alpha_2:

a) Alpha_1=1, Alpha_2=0: only the voice input of the user is recorded.

b) Alpha_1=0, Alpha_2=1: only the remote other party is recorded. In addition, it is possible here to set Gamma_2 to ≠0 at the start of the recording and thus transmit an indication from the memory 30 to the remote subscriber, specifying, for example, that the call is being recorded.

c) Alpha_1≠0, Alpha_2≠0: both speakers are recorded here, it being possible to obtain an appropriate drive level of the two voice signals by appropriately setting Alpha_1 and Alpha_2 between 0 and 1 so that the voice of the local subscriber and that of the remote subscriber have approximately the same volume. Here too, it is possible to output an indication to the remote party at the start of the recording by actuating Gamma_2≠0.

3. Recorded Voice is Played Back During the Telephone Call:

weighted outputting of signals is possible by setting the controllable amplifiers Gamma_1, Gamma_2 and Beta_1, Beta_2:

a) By setting Gamma_1 and Gamma_2 it is possible to determine what is sent to the remote subscriber:

aa) Gamma_1≠0, Gamma_2≠0: the instantaneous voice input of the local subscriber is transmitted, together with the previously stored message.

ab) Gamma_1=0, Gamma_2≠0: only the previously stored message is output.

b) The Beta_1 and Beta_2 settings influence what the local subscriber himself hears:

ba) Beta_1≠0, Beta_2≠0: the received signal and the previously stored message are output.

bb) Beta_1=0, Beta_2≠0: only the previously stored message is output.

Items 3a and 3b can be freely combined as desired.

In the present invention it is therefore advantageous that the method for voice encoding and decoding of the signal to be stored does not necessarily have to correspond to the method which is used for encoding and decoding the transmit signal and receive signal.

The DTX method (discontinuous transmission) used in the GSM mobile radio system can be used in encoding data for storing voice in order to perform the subsequent compression of the data record. As a result, a recording period which is on average increased can be achieved when recording capacity is limited (i.e. there is limited storage space).

Because the recording of the received signal taps the signals after the normal voice decoding, there is always a corrected voice signal available. As a result, even signals received as interference are recorded correctly.

We claim:

1. A circuit for recording and playing back voice and other sounds in digital mobile radio devices, comprising:

a transmit signal path including a first voice encoder configured therein for encoding voice signals to be transmitted via a radio link;

a receive signal path including a first voice decoder configured therein for decoding voice signals received via the radio link;

a memory for storing voice signals and for outputting the voice signals;

a second voice encoder having an output connected to said memory;

a second voice decoder having an input connected to said memory for receiving the voice signals from said memory, said second voice decoder configured for decoding the voice signals and for sending the voice signals to a loudspeaker;

said first voice decoder configured to always decode ones of the voice signals received via the radio link that are to be stored in said memory and to send the decoded ones of the voice signals to said second voice encoder for subsequent encoding; and a third voice decoder having an input connected to said memory for receiving the voice signals from said memory, said third voice decoder configured for decoding the voice signals from said memory and for sending the voice signals to the transmit signal path.

2. The circuit according to claim 1, wherein said first voice encoder has an input and said third voice decoder has an output connected to said input of said first voice encoder.

3. The circuit according to claim 1, comprising:

a microphone; and a first summing point;

said first voice decoder having an output, said first summing point connecting said second voice encoder to said output of said first voice decoder and to said microphone.

4. The circuit according to claim 3, comprising:
a first controllable amplifier connected between said output of said first voice decoder and said first summing point; and
a second controllable amplifier connected between said microphone and said first summing point.

5. The circuit according to claim 1, comprising a further summing point having a first input connecting said second voice decoder to the loudspeaker and having a second input, said first voice decoder having an output connected to said second input of said further summing point.

6. The circuit according to claim 5, comprising:
a first controllable amplifier, said second voice decoder having an output, said first controllable amplifier connected between said output of said second voice decoder and said first input of said further summing point; and
a second controllable amplifier connected between said output of said first voice decoder and said second input of said further summing point.

7. The circuit according to claim 2, comprising:
a microphone; and
a summing point connected between said input of said first voice encoder and said output of said third voice decoder, said summing point having an input connected to said microphone.

8. The circuit according to claim 7, comprising:
a first controllable amplifier connected between said output of said third voice decoder and said summing point; and
a second controllable amplifier connected between said microphone and said input of said summing point.

9. A method for recording and playing back voice and other sounds in digital mobile radio devices in which the voice is transmitted in digitally encoded form, which comprises:

encoding voice signals to be transmitted by a radio link through a transmit signal path having a first voice encoder;

decoding voice signals received through the radio link through a receive signal path having a first voice decoder configured therein for;

storing and outputting the voice signals with a memory;

connecting an output of a second voice encoder to the memory;

receiving the voice signals from the memory through an input of a second voice decoder connected to the memory;

configuring the second voice decoder to decode the voice signals from the memory and to send the voice signals to a loudspeaker;

configuring the first voice decoder to always decode respective voice signals received through the radio link to be stored in the memory and to send the decoded respective voice signals to the second voice encoder for subsequent encoding;

receiving the voice signals from the memory through an input of a third voice decoder connected to the memory; and decoding the voice signals from the memory and sending the voice signals to the transmit signal path with the third voice decoder.

10. The method according to claim 9, which comprises:
using a voice encoding circuit to encode the voice signal to be stored that is different from a circuit used to encode the voice signal that is transmitted via the radio link; and
using a voice decoding circuit to decode the stored voice signal that is different from a circuit used to decode the voice signal that is transmitted via the radio link.

\* \* \* \* \*